United States Patent
Psounis et al.

(10) Patent No.: US 7,603,483 B2
(45) Date of Patent: *Oct. 13, 2009

(54) METHOD AND SYSTEM FOR CLASS-BASED MANAGEMENT OF DYNAMIC CONTENT IN A NETWORKED ENVIRONMENT

(75) Inventors: Konstantinos Psounis, Santa Monica, CA (US); Janardhanan Jawahar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/756,239

(22) Filed: May 31, 2007

(65) Prior Publication Data

US 2007/0226371 A1     Sep. 27, 2007

Related U.S. Application Data

(63) Continuation of application No. 09/816,802, filed on Mar. 23, 2001, now Pat. No. 7,310,687.

(51) Int. Cl.
    G06F 15/16    (2006.01)
(52) U.S. Cl. .............................. 709/247; 707/2; 707/6; 707/101
(58) Field of Classification Search .................. 709/231, 709/232, 235, 246, 247; 707/2, 6, 101
    See application file for complete search history.

(56) References Cited

U.S. PATENT DOCUMENTS 5,754,766 A    5/1998    Shaw et al.
5,778,372 A    7/1998    Cordell et al.
5,862,220 A    1/1999    Perlman
5,880,740 A    3/1999    Halliday et al.
5,918,225 A    6/1999    White et al.

(Continued)

FOREIGN PATENT DOCUMENTS

| EP | 0434041 B1 | 6/1991 |
| JP | 08044750 | 2/1996 |
| JP | 02001034526 | 2/2001 |
| WO | WO-0042519 A1 | 7/2000 |

OTHER PUBLICATIONS

"Breaking New Ground in Content Acceleration", *FineGround Networks—A Technical White Paper*, (2001),1-9.

(Continued)

*Primary Examiner*—Andrew Caldwell
*Assistant Examiner*—Michael D Meucci
(74) *Attorney, Agent, or Firm*—Schwegman, Lundberg & Woessner, P.A.

(57) ABSTRACT

The present application discloses methods and systems for configuring and managing class-based condensation. One aspect thereof includes an automated mechanism to receive a user request for a document, retrieve the document from a content server, and compare the document to a base file of a document class. If a delta-difference between the requested document and the base file is less than a predetermined threshold value, create a condensed document by abbreviating redundancy in the requested document relative to the base file of the associated document class, associate the document with the document class, and transmit the condensed document to the user. The documents within a document class possess similar layouts.

20 Claims, 12 Drawing Sheets

U.S. PATENT DOCUMENTS

| | | | |
|---|---|---|---|
| 5,918,239 | A | 6/1999 | Allen et al. |
| 5,933,811 | A | 8/1999 | Angles et al. |
| 5,933,842 | A | 8/1999 | Ross |
| 5,946,697 | A | 8/1999 | Shen |
| 5,953,503 | A | 9/1999 | Mitzenmacher et al. |
| 6,006,227 | A | 12/1999 | Freeman et al. |
| 6,011,905 | A | 1/2000 | Huttenlocher et al. |
| 6,012,071 | A | 1/2000 | Krishna et al. |
| 6,018,738 | A | 1/2000 | Breese et al. |
| 6,038,573 | A | 3/2000 | Parks |
| 6,076,104 | A | 6/2000 | McCue |
| 6,078,917 | A | 6/2000 | Paulsen, Jr. et al. |
| 6,085,234 | A | 7/2000 | Pitts et al. |
| 6,092,090 | A | 7/2000 | Payne et al. |
| 6,098,092 | A | 8/2000 | Padzensky |
| 6,105,042 | A | 8/2000 | Aganovic et al. |
| 6,108,703 | A | 8/2000 | Leighton et al. |
| 6,122,666 | A | 9/2000 | Beurket et al. |
| 6,128,655 | A | 10/2000 | Fields et al. |
| 6,167,085 | A | 12/2000 | Saunders et al. |
| 6,176,427 | B1 | 1/2001 | Antognini et al. |
| 6,178,461 | B1 * | 1/2001 | Chan et al. ............. 709/247 |
| 6,182,125 | B1 | 1/2001 | Borella et al. |
| 6,192,366 | B1 | 2/2001 | Ogawa |
| 6,195,101 | B1 | 2/2001 | Bossut et al. |
| 6,199,082 | B1 | 3/2001 | Ferrel et al. |
| 6,216,121 | B1 | 4/2001 | Klassen |
| 6,230,171 | B1 | 5/2001 | Pacifici et al. |
| 6,243,761 | B1 | 6/2001 | Mogul et al. |
| 6,247,050 | B1 | 6/2001 | Tso et al. |
| 6,249,844 | B1 | 6/2001 | Schloss et al. |
| 6,263,114 | B1 | 7/2001 | Saunders |
| 6,272,536 | B1 | 8/2001 | van Hoff et al. |
| 6,308,179 | B1 | 10/2001 | Petersen et al. |
| 6,317,757 | B1 | 11/2001 | Sakamaki |
| 6,317,885 | B1 | 11/2001 | Fries |
| 6,381,618 | B1 | 4/2002 | Jones et al. |
| 6,405,211 | B1 | 6/2002 | Sokol et al. |
| 6,466,999 | B1 | 10/2002 | Sliger et al. |
| 6,476,828 | B1 | 11/2002 | Burkett et al. |
| 6,490,601 | B1 | 12/2002 | Markus et al. |
| 6,496,849 | B1 | 12/2002 | Hanson et al. |
| 6,507,856 | B1 | 1/2003 | Chen et al. |
| 6,538,667 | B1 | 3/2003 | Duursma et al. |
| 6,574,618 | B2 | 6/2003 | Eylon et al. |
| 6,591,260 | B1 | 7/2003 | Schwarzhoff et al. |
| 6,610,103 | B2 | 8/2003 | Ehrman et al. |
| 6,622,168 | B1 | 9/2003 | Datta |
| 6,697,844 | B1 | 2/2004 | Chan |
| 6,748,385 | B1 | 6/2004 | Rodkin et al. |
| 6,990,628 | B1 * | 1/2006 | Palmer et al. ............. 715/234 |
| 7,020,658 | B1 | 3/2006 | Hill |
| 7,047,281 | B1 | 5/2006 | Kausik |
| 7,130,848 | B2 | 10/2006 | Oosta |
| 7,139,976 | B2 | 11/2006 | Kausik et al. |
| 7,310,687 | B2 | 12/2007 | Psounis et al. |
| 7,321,937 | B2 * | 1/2008 | Fallon ............. 709/231 |
| 7,359,901 | B2 * | 4/2008 | Lee et al. ............. 707/6 |
| 2001/0013042 | A1 | 8/2001 | Sekine |
| 2002/0087797 | A1 | 7/2002 | Adrangi |
| 2006/0206796 | A1 | 9/2006 | Kausik et al. |
| 2007/0226229 | A1 | 9/2007 | Psounis et al. |
| 2007/0226371 | A1 | 9/2007 | Psounis et al. |

OTHER PUBLICATIONS

"Deploying FineGround Condensers in an SSL Environment", *FineGround Networks—A Technical White Paper*, (2001), 1-5.

"FineGround Networks—Products & Technology—White Paper", [online]. FineGround Networks, Inc., 2001. Retrieved from the Internet: <URL: wysiwyg://7/http://www.fineground.com/prod/whitepaper.html,(2001),1 pg.

"Network Products—Edge Services", [online]. Inktomi Corporation, 1996-2001. [retrieved on May 22, 2001]. Retrieved from the Internet: <URL: http://www.inktomi.com/products/network/products/cclass_edge.html,2 pgs.

"Network Products—Inktomi Traffic Server C-Class", [online]. Inktomi Corporation, 1996-2001. [retrieved on May 22, 2001]. Retrieved from the Internet: <URL: http://www.inktomi.com/products/network/products/tscclass.html and http://www.inktomi.com/products/network/products/cclass_works.html>,4 pgs.

"Network Products—Inktomi Traffic Server E-Class", [online]. Inktomi Corporation, 1996-2001. [retrieved on May 22, 2001]. Retrieved from the Internet: <URL: http://www.inktomi.com/products/network/products/tseclass.html,2 pgs.

"Network Products—Robust, High-Performance Cache Platform", [online]. Inktomi Corporation, 1996-2001. [retrieved on May 22, 2001]. Retrieved from the Internet: <URL: http://www.inktomi.com/products/network/products/cclass_tech.html,5 pgs.

"Network Products—Traffic Server Engine", [online]. Inktomi Corporation, 1996-2001. [retrieved May 22, 2001]. Retrieved from the Internet: <URL: http://www.inktomi.com/products/network/products/tsengine.html>,4 pgs.

Aycock, John, et al., "An Architecture for Easy Web Page Updating", *Crossroads*, 6, ACM Digital Library (archive),(1999),7 pgs.

Mogul, J., et al., "HTTP Delta Clusters and Templates", *Network Working Group, Internet—Draft*, (Aug. 18, 2000),19 pgs.

Zhu, Huican, "Class Based Cache Management for Dynamic Web Content,", *Technical Report #TRCS00-13, Dept. of Computer Science, UCSB, published Jun. 2000, presented at IEEE InfoCOM Conference Apr. 2001*, (Jun. 2000), 1-10.

Towner, G., "Auto-Updating as a Technical Documentation Tool", *Proceedings of the ACM Conference on Document Processing Systems*, Santa Fe, NM, Dec. 5-9, 1988, p. 31-36.

"U.S. Appl. No. 09/816,802, Notice of Allowance mailed Sep. 12, 2007", 3 pgs.

"U.S. Appl. No. 09/816,802, Response filed Jul. 8, 2005 to Non-Final Office Action mailed Mar. 8, 2005", 6 pgs.

"U.S. Appl. No. 09/816,802, Final Office Action mailed Jun. 22, 2004", 8 pgs.

"U.S. Appl. No. 09/816,802, Non Final Office Action mailed Jan. 14, 2004", 6 pgs.

"U.S. Appl. No. 09/816,802, Non Final Office Action mailed Mar. 8, 2005", 7 pgs.

"U.S. Appl. No. 09/816,802, Notice of Allowance mailed Apr. 5, 2007", 2 pgs.

"U.S. Appl. No. 09/816,802, Response filed Apr. 13, 2004 to Non Final Office Action mailed Jan. 14, 2004", 11 pgs.

"U.S. Appl. No. 09/816,802, Response filed Aug. 16, 2004 to Final Office Action mailed Jun. 22, 2004", 13 pgs.

"U.S. Appl. No. 09/816,802, Response filed Oct. 27, 2005 to Restriction Requirement mailed Sep. 30, 2005", 5 pgs.

"U.S. Appl. No. 09/816,802, Restriction Requirement mailed Sep. 30, 2005", 5 pgs.

"U.S. Appl. No. 11/756,276, Non Final Office Action mailed Apr. 2, 2009", 13 pgs.

"U.S. Appl. No. 11/756,276, Preliminary Amendment filed May 31, 2007", 4 pgs.

* cited by examiner

|  | Sample 1 | Sample 2 | Sample 3 | Sample K |
|---|---|---|---|---|
| Sample 1 | - | $d_{21}$ | $d_{31}$ | $d_{K1}$ |
| Sample 2 | $d_{12}$ | - | $d_{32}$ | $d_{K2}$ |
| Sample 3 | $d_{13}$ | $d_{23}$ | - | $d_{K3}$ |
| Sample K | $d_{1K}$ | $d_{2K}$ | $d_{3K}$ | - |
| Sums | $\Sigma d_{1i}$ | $\Sigma d_{2i}$ | $\Sigma d_{3i}$ | $\Sigma d_{Ki}$ |

METHOD AND SYSTEM FOR CLASS-BASED MANAGEMENT OF DYNAMIC CONTENT IN A NETWORKED ENVIRONMENT

CROSS REFERENCES TO RELATED APPLICATIONS

This application is a continuation of U.S. application Ser. No. 09/816,802, filed on Mar. 23, 2001 now U.S. Pat. No. 7,310,687, which is related to application Ser. No. 09/634,134, filed Aug. 8, 2000, and issued on May 16, 2006 as U.S. Pat. No. 7,047,281, the entire disclosure of which is incorporated herein by reference.

FIELD OF THE INVENTION

The methods and systems of the present invention relate generally to accelerating the delivery of dynamic content in a network environment. In particular, automated class-based cache management is used to provide a scalable way to deliver individualized dynamic content.

BACKGROUND OF THE INVENTION

In order to accelerate delivery and reduce network congestion, Internet Service Providers ("ISPs") often deploy cache servers at strategic locations in the network for storing frequently requested content. These cache servers are physically located closer to end users and therefore are able to deliver content to those end users much faster than the content servers themselves, which could be physically located at the fringes of the network. Furthermore, these cache servers reduce network congestion because by storing frequently requested content, they minimize the need to contact the actual content servers, thereby reducing "upstream" traffic. For example, America Online, Inc. ("AOL") currently utilizes Inktomi's® Traffic Server, a network caching platform, to speed up Web access for its users.[1] When a user requests a Web page, the request is routed to the closest cache server in the AOL network. If the requested Web page is located in the cache server and is current, then the cache server delivers the Web page directly to the user without the need to access the Web server. If the Web page is not located in the cache, the cache server acts as a proxy and fetches the Web page from the Web server on the user's behalf.

[1] See <http://www.inktomi.com/products/network/products/tscclass.html>.

Such cache server schemes are most effective for dealing with static content that does not change or only changes slowly over time. However, since cache servers are only effective as long as their content is current, they have difficulty handling dynamically generated content that quickly changes over time. It is therefore inefficient to cache dynamic content since, by definition, such content will change upon subsequent retrievals. As such, innovative methods for accelerating the delivery of dynamically generated content have been developed. For example, FineGround Networks, Inc. has developed Condensation™ technology that "condenses" dynamic content in real-time. A FineGround "condenser," typically disposed between the cache (or other content server) and the network users, condenses Web pages by eliminating redundancies between successive downloads of the same page.[2] The FineGround Condensations™ technology uses a process hereafter referred to as "delta-encoding" in which a base version of a dynamic document is both locally stored (e.g., in a browser or network cache) and remotely stored at the condenser. When the condenser receives a new request for the dynamic document from the client, the condenser transmits to the user a representation of the difference (in the form of a "condensed document") between the current version and the base version of the dynamic document. Transmission of the condensed document, rather than a complete document, requires less network bandwidth, thereby freeing up bandwidth for other transmissions and accelerating the delivery to the user. Upon receipt of the condensed document, the client uses the locally stored base version to construct the current version. This delta-encoding process is the subject matter of co-pending application Ser. No. 09/634,134, filed Aug. 8, 2000, which is hereby incorporated by reference.

[2] See <http://www.fineground.com/prod/whitepaper.html>.

It is often the case that dynamic documents are template-based or otherwise share the same context and/or characteristics. As such, documents that possess similar layouts can be classified so that content in one document within a "class" can be condensed against content in a different document within the same class. Thus, regardless of which user generates requests, all requests for dynamic documents that belong to the same class can be serviced by the same class base file. This class base file is stored both locally at the client and also remotely at the condenser so that delta-encoding techniques can be utilized.

Nevertheless, current methods for configuring and managing class-based condensation can be improved. First, techniques to efficiently identify and create classes should be developed. Currently, an administrator manually identifies classes that possess similar layouts such that content within that class can be condensed against content within the same class. Furthermore, techniques for selecting an efficient class base file should also be developed. It is beneficial to select an efficient class base file because the performance of the delta-encoding will depend upon how similar the class base file is to the requested dynamic documents (within that class). Currently, however, class base files are typically manually created when a new class is identified by the administrator. As such, the class base file is typically the first requested dynamic document that is a member of the class. It is clear that such an arbitrary document may not necessarily be the best document to serve as the class base file. Therefore, there remains a great need for an automated mechanism to efficiently configure and manage classed-based condensation.

SUMMARY

The present application discloses methods and systems related to configuring and managing class-based condensation. One aspect of this application describes an automated mechanism for creating classes and grouping requests within the classes. A second aspect describes an automated mechanism for selecting and updating an efficient class base file for each class. A third aspect describes an automated mechanism for maintaining the security of users by excluding private user information from the class base file.

Creating Classes and Matching Requested Documents

In an exemplary embodiment, the creation of classes is performed by a condenser that is situated near the content servers that generate dynamic content. The condenser maintains an efficient data structure that holds information about the current classes stored in the condenser, including information used to access the class base files. When the condenser receives a request for a dynamic document, it retrieves the updated version of the requested document from the content server. If the request is not already associated with a class, the condenser then searches its data structure to determine whether the requested document can be a member of any of the current classes. If the condenser determines that the requested document cannot be a member of any current class, it may then create a new class based upon the requested document, which is then stored in the data structure. Otherwise, the condenser finds a match between the requested document and a current class. It extracts the class base file associated with the current class and performs a delta-encoding process to obtain a condensed document reflecting the difference between the requested document and the class base file. The condenser then transmits the condensed document to the requester. Upon receipt of the condensed document, the requester reconstructs the complete requested document by combining the condensed document with a locally stored class base file associated with the specific class. If the requester does not have the class base file, then the condenser can either (1) send the class base file to the requester along with the condensed document, or (2) send the full requested document to the requester rather than the condensed document. The techniques for creating classes and matching requested documents are further described in the detailed description section.

Selecting and Updating an Efficient Class Base File

As noted earlier, it is beneficial to select an efficient class base file for each class since the performance of the delta-encoding and the quality of the resulting condensed document will depend upon how similar the class base file is to the requested documents. Current methods typically use the first document to be classified in a new class as the class base file. Theoretically, the ideal method for selecting an efficient class base file would be to choose a file that minimizes the sum of the "delta-differences" between that file and all other requested documents within that class. In an exemplary embodiment, the delta-difference between two documents could be the byte size of the condensed document produced by delta-encoding. However, those skilled in the art will recognize that the delta-difference may be any value that measures the similarities between two documents in a meaningful fashion. Such an ideal minimization would have the effect of optimizing various criteria, including the computational effort and time for calculation of the condensed document at the condenser, the size of the condensed document, the time of transmission of the condensed document to the user; and the computational effort required to reconstruct the requested document by the user. However, such an ideal method is not possible since future requests are not known at the time of selection. We discuss below various methods that an exemplary embodiment of the invention could utilize to select an efficient class base file while still substantially optimizing one or more of the above criteria.

A first method selects a class base file from a randomly chosen sample of requested documents within a class. The class base file is that file which minimizes the sum of the delta-differences between the file and the other requested documents in the sample. Periodically, a sample of requested documents is updated and a new class base file is chosen. In contrast, a second method actually creates a class base file rather than choosing a particular requested document within the class as the class base file. This method maintains a data structure that keeps track of the popularity of components of requested documents within classes. Requested documents within the class are randomly selected and broken down into their components. These components are then recorded and tabulated in the data structure. The most popular components are then aggregated to create the class base file. Periodically, the data structure is updated with components from new requested documents and a new class base file is chosen based upon reassessment of the popularity of the components. These two techniques for selecting and updating an efficient class base file are further described in the detailed description section.

Maintaining the Security of Users

A third aspect of the application addresses the need to secure private information that might be contained in personalized dynamic documents. That is, despite solving scalability issues, class-based condensation also raises security and privacy concerns since different users will share the same class base files and store these files locally on their own machines. To address the problem, an exemplary embodiment of the invention may maintain a data structure that keeps track of the components of the class base file that also are present in requested documents that are members of the class. The class base file is compared to a set of such requested documents, where each request for a document in the set originates from a different end user. For every component of the class base file, a counter in the data structure associated with that component is incremented when that component is also present in a requested document from the set. Any component in the data structure whose counter fails to meet a threshold value may contain the private information of a particular user and may be therefore removed from the class base file, thereby improving the anonymity of the class base file. These techniques for maintaining the security of users and improving the anonymity of the class base file are further described in the detailed description section.

BRIEF DESCRIPTION OF THE DRAWINGS

FIG. 7 is a diagram illustrating an exemplary data structure for maintaining a sample set of requested documents.

DETAILED DESCRIPTION

Figure 1:
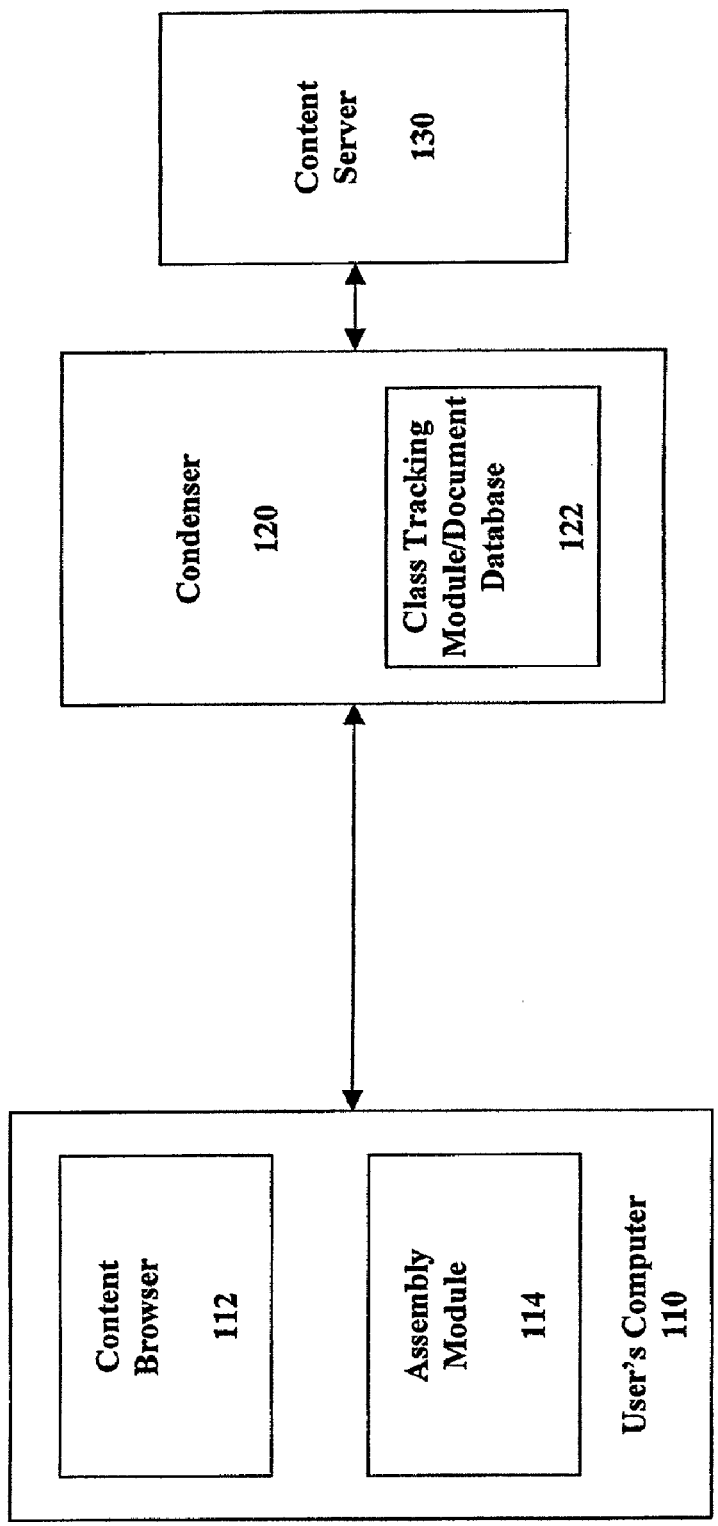
FIG. 1 is a block diagram illustrating an exemplary computer system for accelerating the delivery of content in a network environment.

FIG. 1 is a block diagram illustrating an exemplary computer system within which the present invention may operate. For convenience, the invention will be described herein with respect to "documents" (or, equivalently, "files") which should be understood to include any content-bearing items transmitted in a network environment, including without limitation, text, data, or graphic files (or combinations thereof), images, objects, programs, scripts, and other kinds of documents.

The system contemplates a network of computers and software running thereon, including a user's computer 110, a condenser 120, and a content server 130. The condenser 120 further includes a class tracking module/document database 122 that contains various data structures and databases for configuring and managing class-based condensation. The user's computer further includes a content browser 112 and an assembly module 114. The assembly module 114 may be implemented in many ways. In an exemplary embodiment, the condenser 120 ships the assembly module 114 as a self-unwrapping Javascript program to the user's computer 110 during an initial interaction between the condenser 120 and the user's computer 110. In alternate embodiments, the assembly module 114 may be implemented, without limitation, as preinstalled programs or "browser plug-ins," or with platform independent languages such as Java or scripting languages such as Javascript that are downloaded and executed on the fly. In this exemplary embodiment, the network is deployed over the Internet, although those skilled in the art will recognize that any public or private communication network including, without limitation, extranets, intranets, wireless networks and other telephonic or radio communications networks could also be used. Similarly, as used herein, the term computer refers to any device that processes information with an integrated circuit chip, including without limitation, mainframe computers, work stations, servers, desktop computers, portable computers, embedded computers, and hand-held computers.

In an exemplary embodiment of the invention, the condenser 120 may be operated by the same content provider that operates the content server or by a third party. The condenser 120 is configured transparently, as if it were a router so that all content to a content server 130 is directed through the condenser 120. Such a transparent configuration does not require manual configuration of the content browser 112 to direct traffic to the condenser 120. Those skilled in the art will recognize that nontransparent configurations, where manual configuration of the content browser 112 is used, may also be implemented in alternate embodiments. Additionally, this exemplary embodiment implements the condenser 120 as software running on a computer separate from any cache (or other content server) in the network. An exemplary embodiment situates the condenser 120 near content servers that may dynamically generate content such that network traffic between the condenser 120 and the user is minimized over a maximum length of network. Such a condenser 120 can serve multiple users by maintaining historic information about the pages most frequently requested by each user. However, those skilled in the art will recognize that the condenser 120 may be integrated into any cache (or other content server) in the network. Those skilled in the art will also recognize that the condenser 120 may be also be implemented as various combination of software and/or hardware and integrated into lower level network connectivity devices, such as routers or switches.

Creating Classes and Matching Requested Documents

Figure 2:
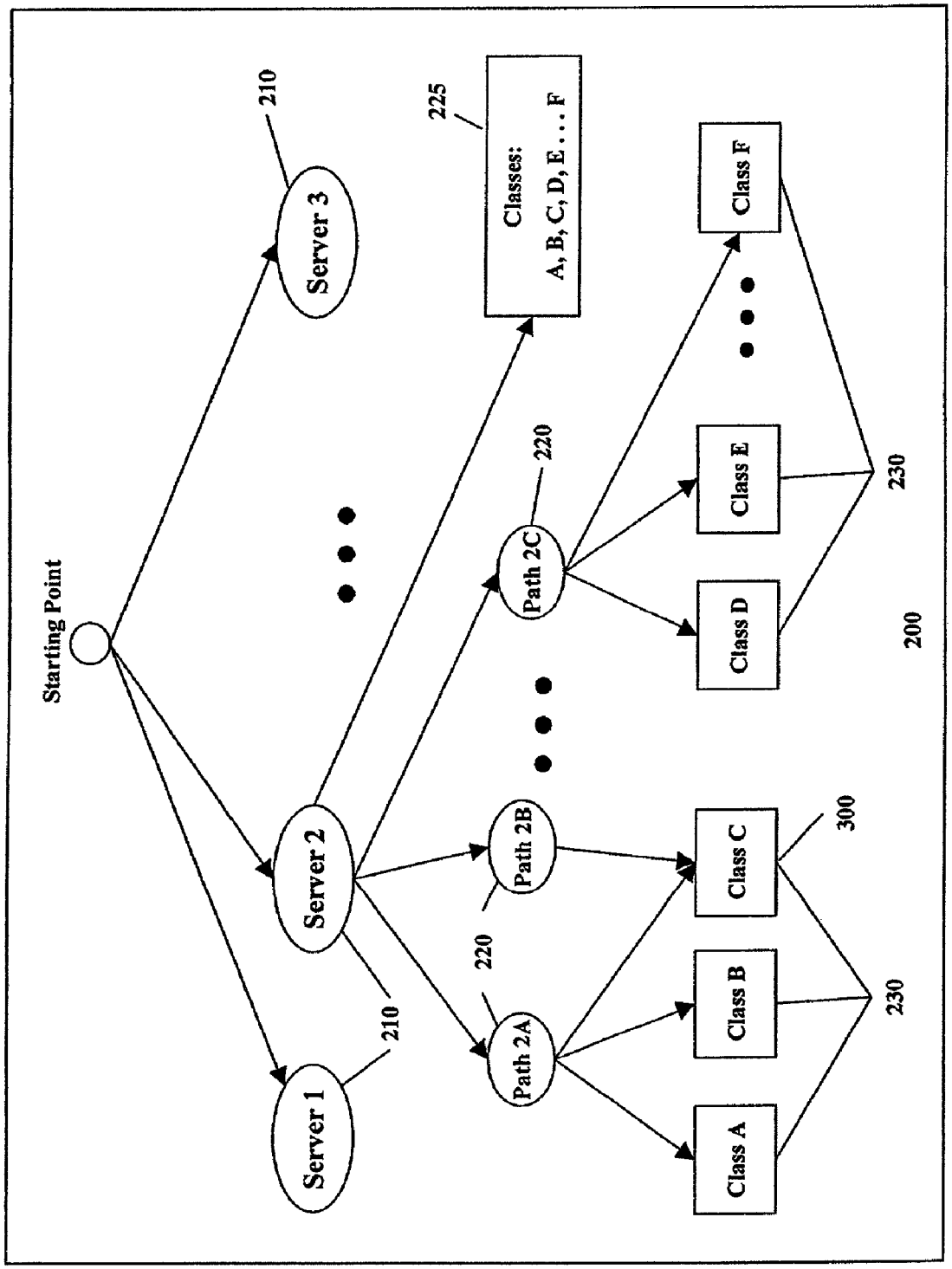
FIG. 2 is a diagram illustrating an exemplary data structure for maintaining information about current classes stored at the condenser.
Figure 3:
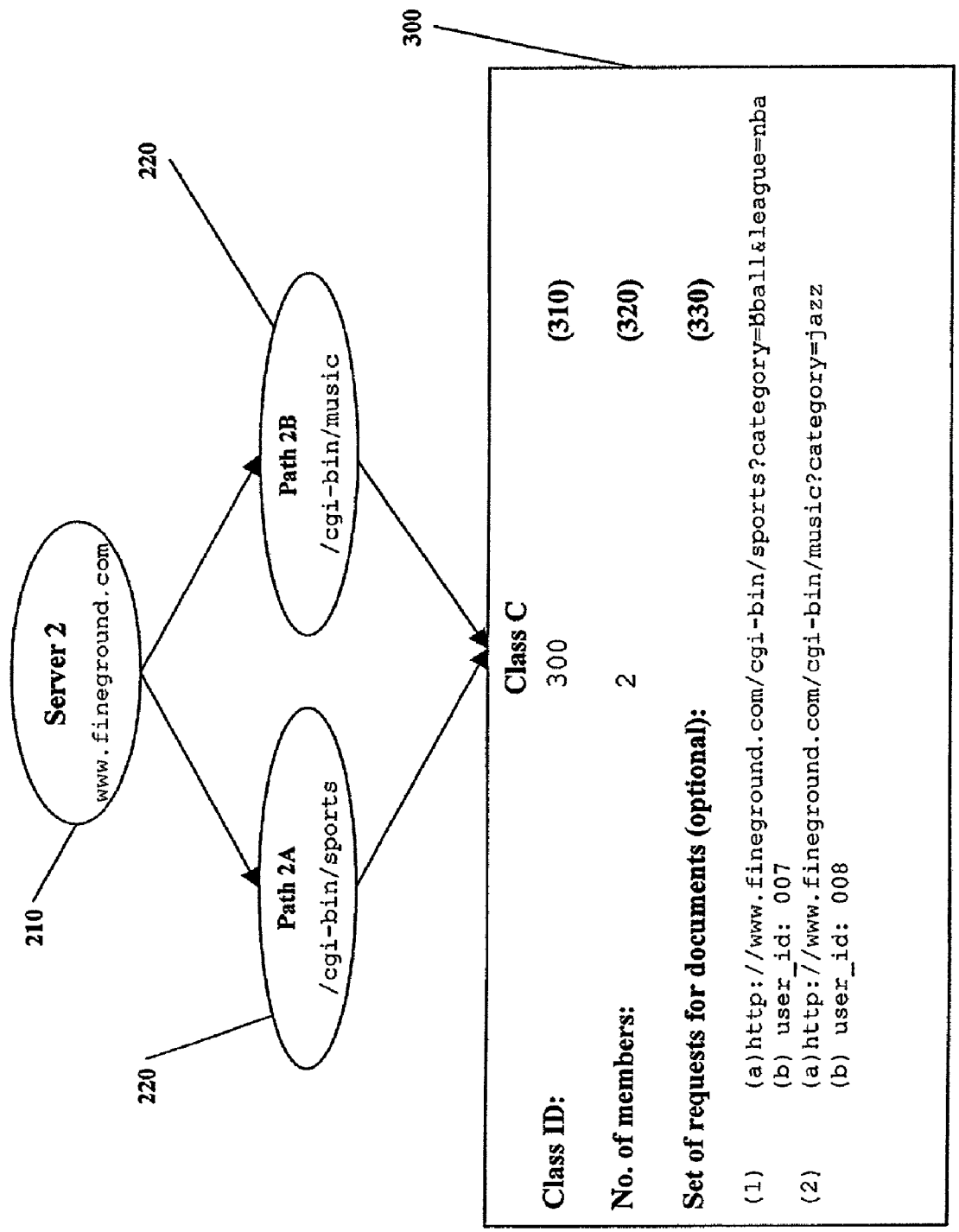
FIG. 3 is a diagram illustrating an exemplary representation of a class within the World Wide Web context.
Figure 4:
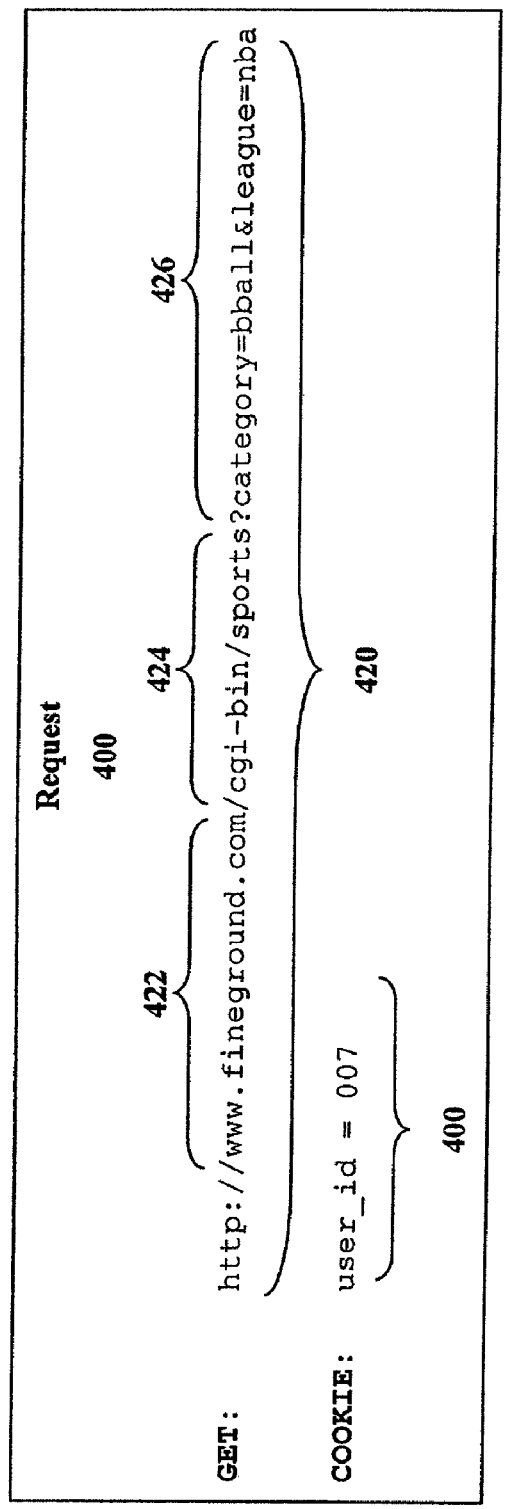
FIG. 4 is a block diagram illustrating an exemplary format of a request from a user for a dynamic document in the World Wide Web context.

As noted earlier, the class tracking module/database 122 of the condenser 120 maintains an efficient data structure that holds information about the current classes stored in the condenser, including information user to access the class base files. For an exemplary embodiment of the invention that is utilized in the World Wide Web ("Web") context, the data structure is organized according to the structure and contents of Uniform Resource Locators ("URL"), in order to take advantage of the way content is typically organized within a Web site. Referring to FIG. 2, the data structure in an exemplary embodiment may be visualized as having, at the top of the structure, server objects 210 for each content server that has been accessed by the condenser. Each server object 210 may contain a set of path objects 220 corresponding to requested paths within the server. Furthermore, a server object 210 may also contain a classes object 225 that provides access to all the classes corresponding to that particular server. Each path object may contain a set of class objects 230 corresponding to classes created by the condenser. As illustrated in FIG. 2, it is possible for a class 300 to be associated with more than one path object 220 in a server object 210. As illustrated in further detail in FIG. 3, class 300 is an exemplary class in the Web context containing a class identification number 310 and a count 320 of the number of its "members" (i.e. matching requests). Optionally, the class 300 may also contain a set of requests 330 for the members of the class. In FIG. 4, an exemplary embodiment of a request 400 received by the condenser 120 in a Web context may include a unique identifier, such as a cookie 410, that binds the request to the user, and a URL 420 that possibly includes a server 422, path 424, and URL arguments 426 portion. Together, the URL 420 and the cookie 410 may be used to define the request (and requested document) as a unique member of a class. While the data structure 200, class 300, and request 400 are structured to take advantage of the typical organization of content on the Web, those skilled in the art will recognize that in other contexts, and even with Web sites that employ atypical content organization, these elements may be organized according to a different structure.

Figure 5:
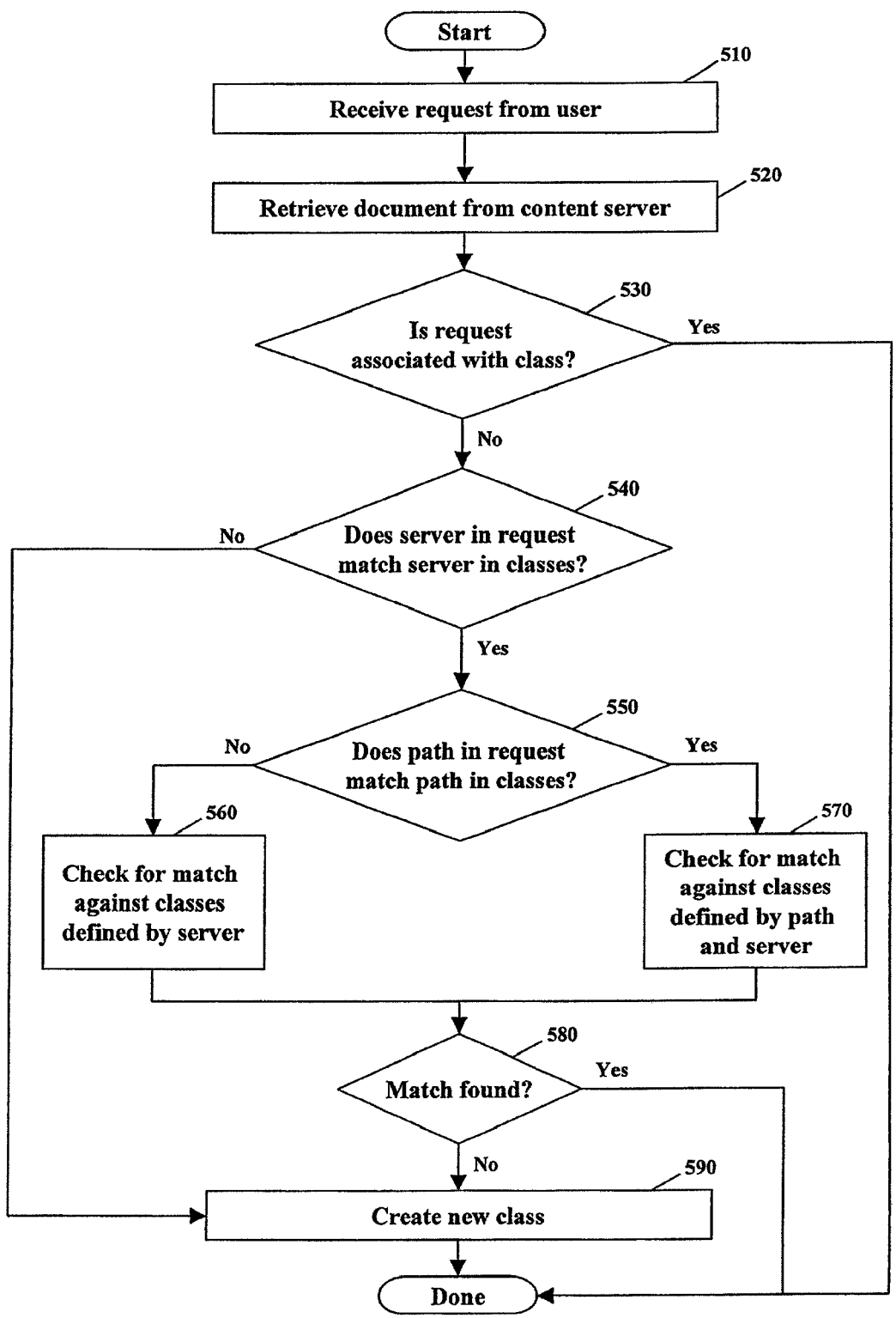
FIG. 5 is a flow chart illustrating an exemplary method for creating classes and matching requested documents.

In accordance with FIG. 5, once the condenser receives a request 400 at step 510, it retrieves the requested document from the content server at step 520. It then determines whether the requested document is a member of a current class in the data structure 200. To make this determination, an exemplary embodiment of the condenser may maintain a data structure in the form of a 1-to-1 mapping between every request received and grouped by the condenser and its class identification number. At step 530, if the request is already associated with a class then there is no need to make a further determination. For example, a request may be already associated with a class when it is a subsequent request for a document from a user, such that the a prior request for the document by the same user had been associated with the class. When a request is already associated with a class, the class base file is extracted using the class identification number, a condensed document is created through delta-encoding, and the condensed document is sent to the user, who reconstructs the full requested document using a locally stored class base file. Otherwise, at step 540, if there are no classes in the data structure 200 that are defined in part by the server 422, then the condenser will create a new class corresponding to the requested document (and associated request) at step 590. At step 550 if there are no classes defined in part by the path 424, then at step 560 the condenser checks for a match against classes that are defined in part by the server 422 (but perhaps having different paths and arguments). However, if there are classes defined by both the server 422 and the path 424, then at step 570, the condenser checks for a match against classes that are defined by both the server 422 and path 424 (but perhaps having different arguments). If, at step 580, a match is not found from steps 560 or 570, then a new class is created at step 590 corresponding to the requested document (and associated request). Whether a matching class or new class is determined, the condenser then sends a condensed document along with the corresponding class base file to the user. However, if a class base file has not yet been created, or the foregoing steps are performed offline, then the condenser may send the full requested document to the user instead.

Figure 6A:
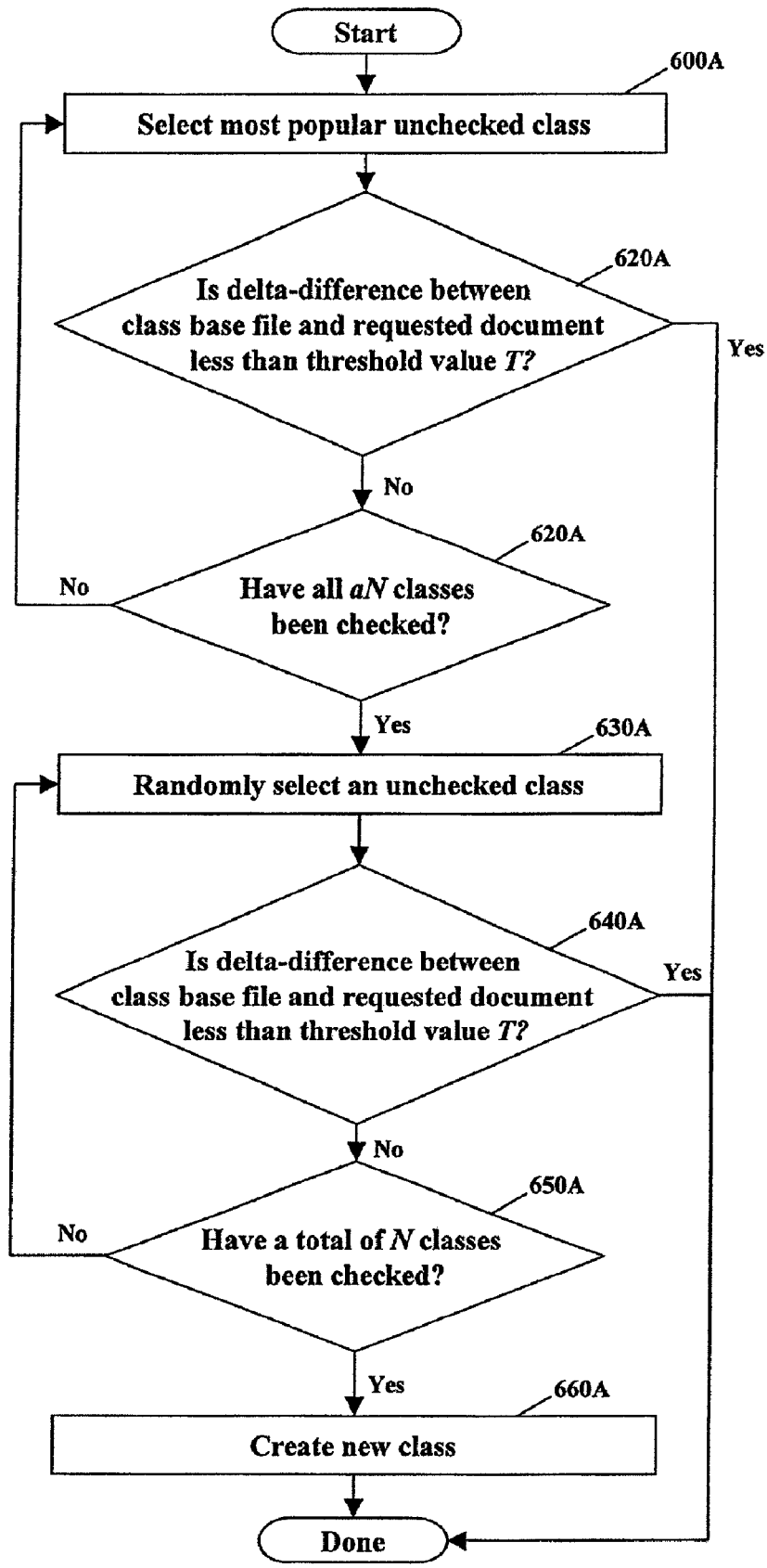
FIG. 6A is a flow chart illustrating a first exemplary method for matching a requested document to a class.
Figure 6B:
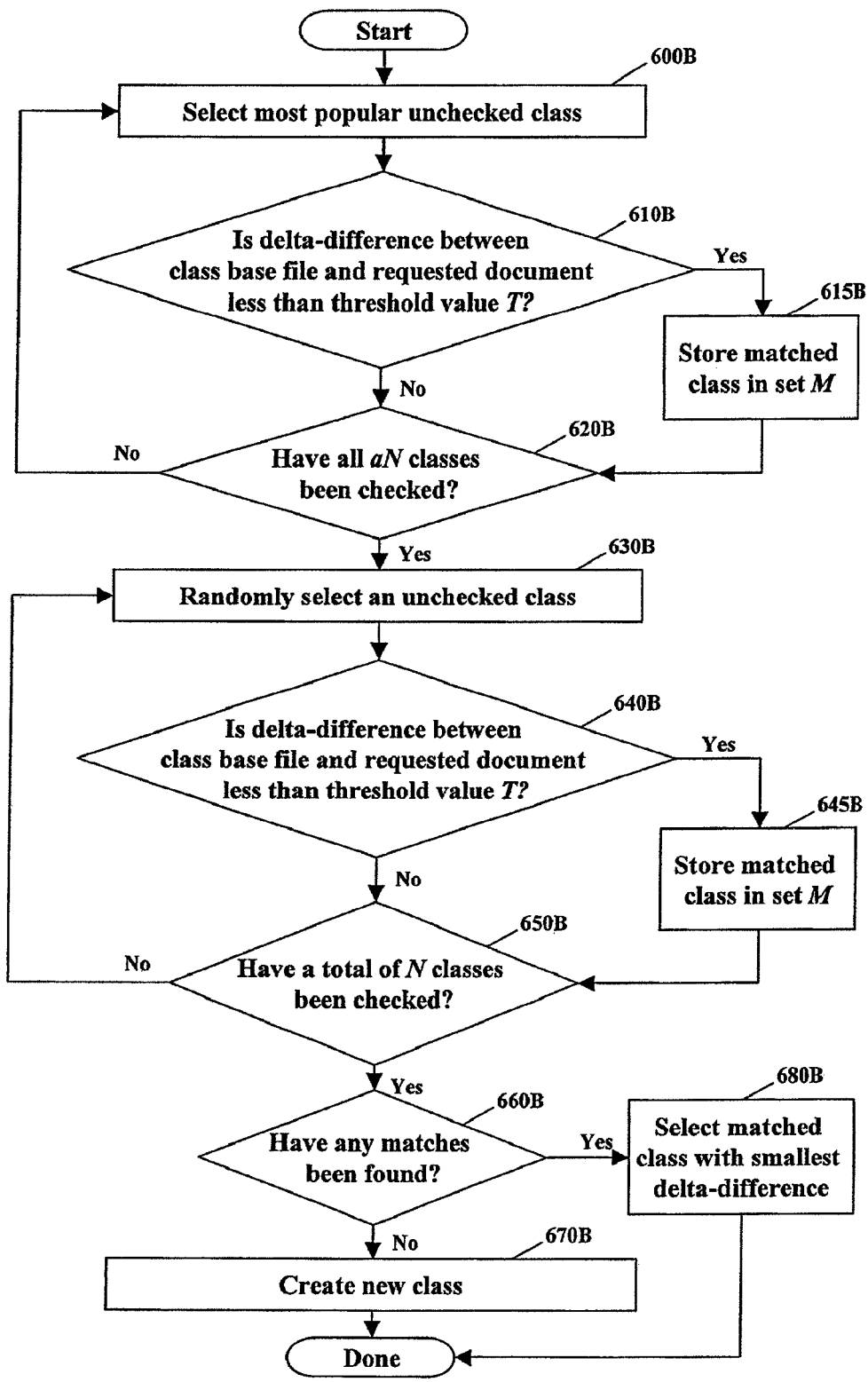
FIG. 6B is a flow chart illustrating a second exemplary method for matching a request document to a class.

FIGS. 6A and 6B illustrate exemplary methods to check for a match against a set of classes, as occurs in step 560 or 570 of FIG. 5. A match between a requested document and a class occurs when the delta-difference between the requested document and the class base file is less than a given threshold value, T. Indeed, in addition to normal delta-encoding techniques, other lighter and quicker techniques to determine delta-differences can be used since it is unnecessary to produce a condensed document as is required for normal delta-encoding purposes. For example, those skilled in the art will recognize that known lossy algorithms, as opposed to lossless algorithms, may also be used to determine delta-differences. Similarly, other known optimization techniques can be used to increase the efficiency of computing delta-differences.

If the set of classes for which a requested document needs to be checked against is too large, then an exhaustive search would clearly be impracticable. Therefore, one exemplary embodiment establishes a threshold number N of classes that are checked within a set. Such checking of most popular classes has the effect of substantially optimizing a combination of criteria including the effort/time of computation by the condenser, the size of the condensed document, and the time of reconstruction by the user, with each criteria being optimized to a varying degree depending on the relative importance thereof to the operator of the condenser.

In the foregoing, the condenser checks for a match against the aN most popular classes in the set, where a is a number less than 1. Popular classes are those classes which have the greatest number of members (i.e. most matches). If no matches are found, then the condenser checks for a match against (a−1)N other classes, selected randomly from within the set. Since a match is determined by a threshold value, T, it is clear that a requested document can match more than one class. Multiple approaches once a match is found in an exemplary embodiment of the invention. Referring to FIG. 6A, in a first approach, once a first match is found, the condenser stops checking and simply selects the matched class. This approach places relatively higher emphasis on substantially optimizing the time/effort to create the condensed document. Thus at step 600A, the condenser selects the most popular unchecked class. If, at step 610A, the delta-difference between the class base file and the requested document is less than the threshold value, T, then a match has been found. If not, then at step 620A, if less than aN of the most popular classes have not been checked, step 600A is repeated. If aN of the most popular classes have been checked, then at step 630A, a randomly selected unchecked class is tested for a match. Again, at step 640A, if the delta-difference between the class base file and the requested document is less than the threshold value, T, then a match has been found. Otherwise, at step 650A, if less than N classes have been checked, step 630A is repeated. If N classes have been checked and no match has been found, then at step 660A, a new class is created for the requested document (note that step 660A is the same as step 590 in FIG. 5).

In contrast, all N classes are checked in a second approach, regardless of the number of matches found, and the best matching class, defined as having the smallest delta-difference, is selected. This approach places relatively higher emphasis on substantially optimizing the size of the condensed document and the time of transmission to the user. Referring to FIG. 6B, at step 600B, the condenser selects the most popular unchecked class. If, at step 610B, the delta-difference between the class base file and the requested document is less than the threshold value, T, then a match has been found and the matching class is stored in set M for later analysis at step 615B. At step 620B, if less than aN classes have been checked, then step 600B is repeated. If aN of the most popular classes have been checked, then at step 630B, a randomly selected unchecked class is tested for a match. Again, at step 640B, if the delta-difference between the class base file and the requested document is less than the threshold value, T, then a match has been found and the matching class is stored in set M for later analysis at step 645B. At step 650B, if less than N classes have been checked, step 630B is repeated. If N classes have been checked and no matches have been found at step 660B, a new class is created for the requested document at step 670B (note that step 670B is the same as step 590 in FIG. 5). However, if matches have been found at step 660B, then the best matching class, defined as having the smallest delta-difference, is selected from set M as the final match at step 680B.

Those skilled in the art will recognize that still other embodiments may be implemented which lie between the first and second approaches as described above. For example, alternative embodiments may select a best match from a number of matching classes less than N, as in the second approach, but greater than one, as in the first approach.

The creation of classes or matching of requested documents can either occur online or offline. Online creation and matching have the advantage that the resulting class base file can be transmitted to the requester as soon as possible (i.e. once a match is found or once a class base file is created). However, such online computations can incur a delay in responding to the request. If offline creation and matching is implemented so as not to incur any delay, a full requested document must be sent back to the client rather than a condensed document and a class base file. Then, a subsequent request from the user will result in the transmission of a condensed document and class base file to be stored locally. Thereafter, only condensed documents need to be transmitted upon requests, until the class base file is updated during a "rebasing." Thus, offline creation or matching increases performance for future requests but not for the current request.

Selecting and Updating an Efficient Class Base File

It is beneficial to select an efficient class base file for each class since the performance of the delta-encoding and the quality of the resulting condensed document will depend upon how similar the class base file is to the requested documents. An exemplary embodiment of the present invention contemplates at least two different methods for selecting and updating an efficient class base file.

In the first method, for each class maintained at the condenser, K random samples of prior requested documents from that class may be stored in memory. Along with those K samples, a data structure is maintained which keeps track of the delta-differences between the samples as well as the sum of the delta-differences with regard to each sample. As shown in FIG. 7, an exemplary embodiment of this data structure 700 can simply be a two-dimensional array that maintains the delta-difference, $d_{ij}$, between each document i and j where i= 1 . . . K and j=1 . . . K. Additionally, as can be seen, the data structure 700 also maintains the sum of all delta-differences for each document i. The class base file for the class is then the sample document that has the minimum sum of delta-differences amongst the samples, as reflected in the data structure 700.

Figure 8:
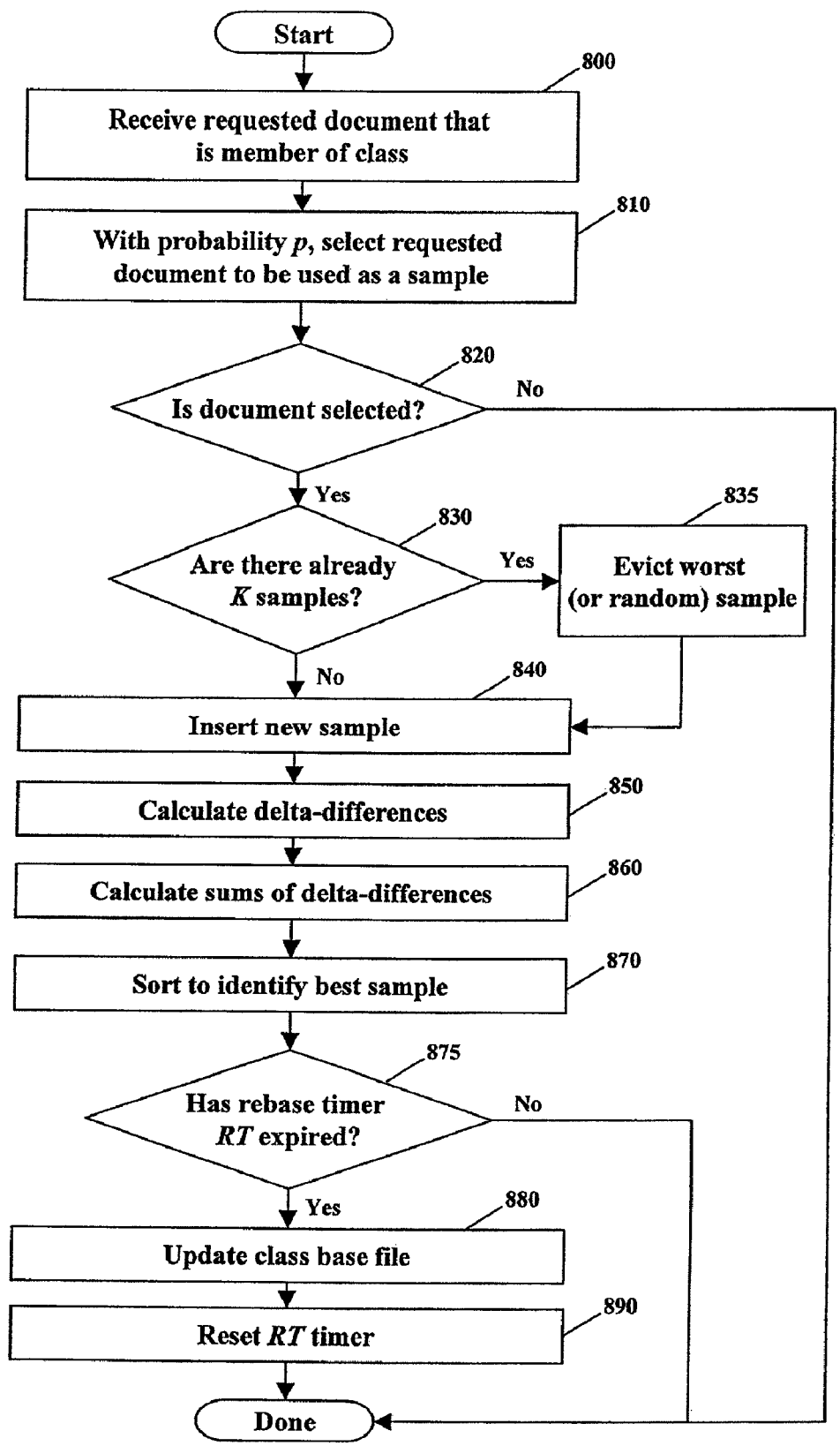
FIG. 8 is a flow chart illustrating a first exemplary method for selecting and updating an efficient class base file.

This data structure 700 is continually updated to keep the requested documents current in order to maintain an efficient class base file. Periodically, a class base file will be updated in order to maintain efficient performance (known as "rebasing"). This is illustrated in FIG. 8. At step 800, the condenser receives a requested document determined to be a member of a class. At step 810, with a probability p, the requested document is selected to be used as a sample in the class. If, the requested document is selected at step 820, then if there are already K samples in the class at step 830, the worst sample (i.e. the one with the maximum sum of delta-differences) is evicted at step 835 and the requested document replaces it as a new sample at step 840. Evicting the worst sample may result in clustering where the K samples are very similar to each other, but not necessarily similar to most of the other requested documents in the class. Thus, periodically, a random sample is evicted instead of the worst to prevent such clustering. At step 850, the delta-differences are calculated between the new sample and remaining old samples. Using the data structure 700, this simply means removing the delta-differences that corresponded to the evicted sample the array and adding the new delta-differences corresponding to the new sample to the array. Similarly, at step 860, the sums of all the delta-differences for each sample is updated reflecting the changes from the new sample. At step 870, the best sample (i.e. the one with the minimum sum of delta-differences) is identified. Clearly, this method performs well because it tends to keep relatively good class base file candidates as samples (and then uses the best of those samples). However, in the extreme cases, the best sample may change every time a new sample is selected. To control the frequency of rebasing, a rebase will occur only if (1) a better base candidate exists, and (2) a rebase timer, RT, running since the previous rebase, has expired. Thus, at step 875, if the rebase timer RT, has expired, a rebase occurs at step 880 and the RT time is reset at step 890.

Additionally, rebasing may also be triggered when the performance of the system is poor. The performance can be poor when the computations for delta-differences are frequently aborted due to a significant difference between the requested document and the class base file, or because many calculated delta-differences are relatively large. When rebasing occurs in this context, all K samples for the class are flushed and the sampling starts anew.

Figure 9A:
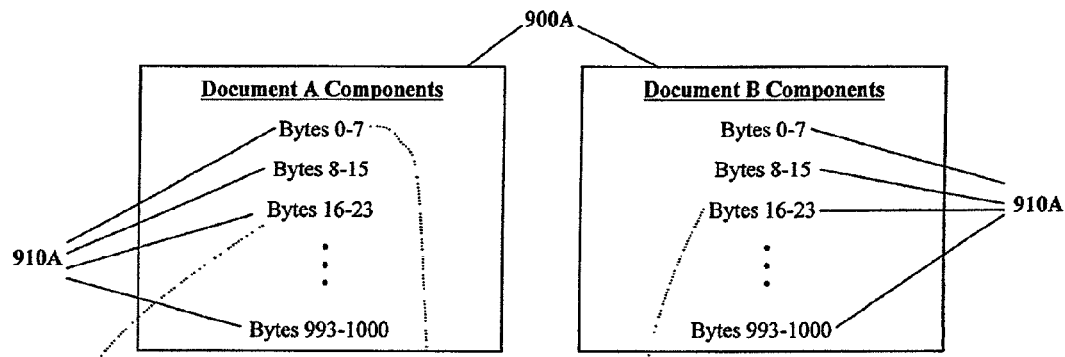
FIG. 9A is a diagram illustrating an exemplary decomposition of a document into components.
Figure 9B:
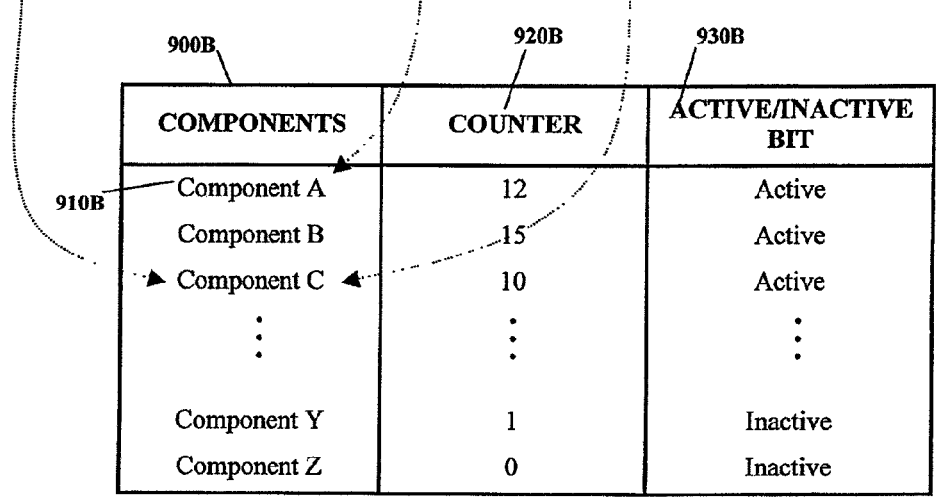
FIG. 9B is a diagram illustrating an exemplary data structure for keeping track of the popularity of document components.
Figure 10:
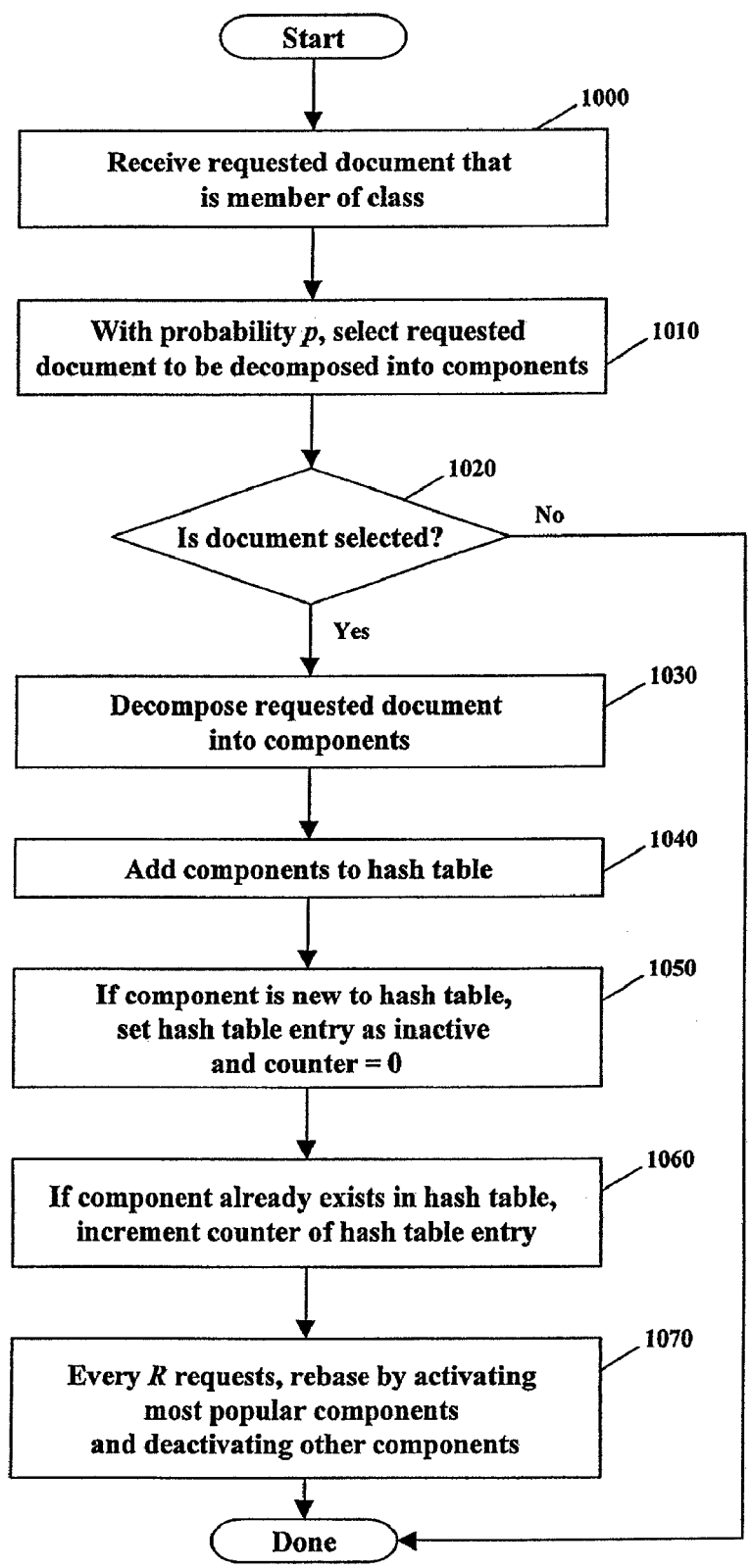
FIG. 10 is a flow chart illustrating a second exemplary method for selecting and updating an efficient class base file.

In the second method, a class base file is created by selecting and aggregating document components that appear most frequently in requested documents pertaining to the class. A requested document can be decomposed into components which are then added and organized in a data structure such as a table. In an exemplary embodiment, components of a requested document may be groups of consecutive bytes within the document. For example, as shown in FIG. 9A, each component 910A of a document 900A may be a series of eight consecutive bytes, where each subsequent component in the document is offset from the prior component by one byte. When a component of a requested document is added to the table 900B, it is associated with a table entry 910B that includes at least (1) a counter 920B to keep track of the number of times the component has been encountered in various requested documents and (2) a bit 930B to indicate whether the component is active or inactive. The class base file is created by selecting those components in the table that are most popular. An exemplary embodiment of the table may utilize hashing of components (i.e. a hash table) to increase the efficiency in accessing table entries. Furthermore, those skilled in the art will recognize that the foregoing method of decomposition is merely an example and that there are a multiplicity of ways in which components may be defined within the invention. As illustrated in FIG. 10, at step 1000, the condenser receives a requested document determined to be a member of a class. At step 1010, with a probability p, the requested document is selected to be decomposed into components. If, at step 1020, it is selected, then at step 1030, the requested document is decomposed into components and at step 1040, the components are added to the table 900. At step 1050, if adding a component results in a new table entry, then the entry is set as inactive and its count is set to zero. If a table entry for an added component already exists, then the count for that entry is simply incremented in step 1060. Finally, at step 1070, upon every R requests, rebasing may occur in which the most popular hash table entries are activated and the other entries are deactivated. The new class base file is then the aggregation of the components associated with the most popular activated hash table entries.

In both the first and second methods, steps 850 to 890 and steps 1030 to 1070, respectively, can be performed offline to improve the performance of future requests, but not the current request. Offline performance of the steps prevents delays due to computation in responding to the current request. Thus, if the steps are performed offline, in response to the current online request, the condenser may transmit to the user either (1) a condensed document based on the current class base file (rather than an updated class base file) that is also stored locally by the user, (2) a condensed document based on the current class base file along with the current class base file itself, or (3) the full requested document, if a new class has been created. In contrast, if the steps are performed online, then in response to the current online request, the condenser may transmit to the user (1) the updated class base file and (2) a condensed document based on this updated class base file. However, as noted earlier, online performance of updating may result in greater delays in responding to the current request.

Maintaining the Security of Users

Figure 11:
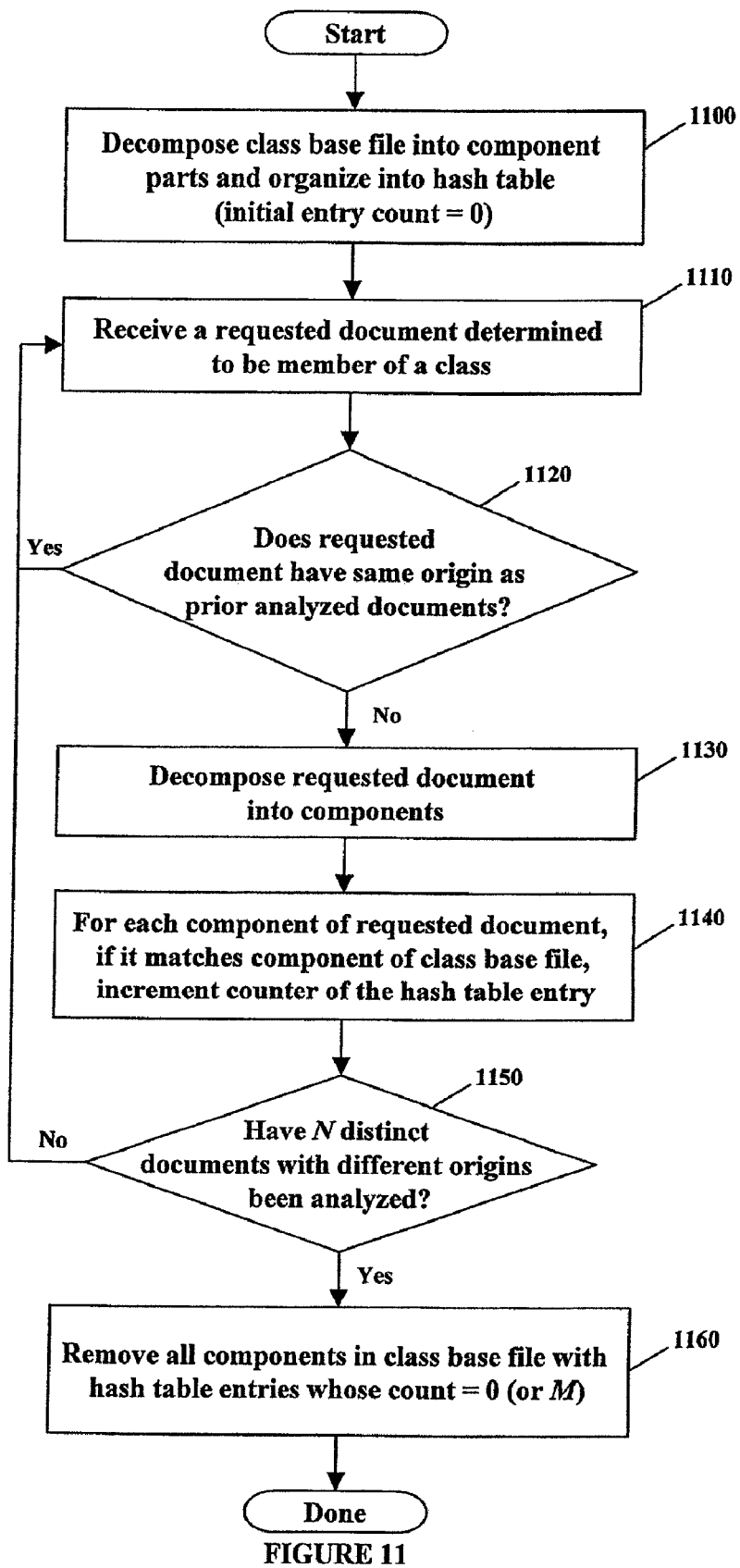
FIG. 11 is a flow chart illustrating an exemplary method for maintaining the security of users.

Despite solving scalability issues, class-based condensation also raises security and privacy concerns since different users will share the same class base files and store these files locally on their own machines. Thus another exemplary aspect of the present invention also addresses the need to secure private information that might be contained in personalized dynamic documents. Such private information may include, but is not limited to, credit cards, charge cards, debit cards, ID numbers, email addresses, phone numbers, home address, personal records, personal preferences, and other private information. In order to secure the privacy of users, a data structure may be used to keep track of document components, as in FIG. 9A. Indeed, if the method of FIG. 10 is used to select and update class base files, then the table 900A can be simultaneously used to implement the security mechanism. As FIG. 11, illustrates, at step 1100, the condenser decomposes the class base file into components and adds them into a hash table. As noted, if the method of FIG. 10 is used to select and update class base files, then this step has already been performed. Otherwise, the hash table is initialized such that all entry counts are zero. At step 1110, the condenser receives a requested document determined to be a member of the class. If, at step 1120, the requested document has the same origin (i.e. same user transmitted the request) as a previously analyzed document, then the requested document is discarded for security purposes, and step 1110 is repeated. Otherwise, at step 1130, the requested document is decomposed into components. At step 1140, if a component of the requested document matches a component of the class base file, then the count of the associated entry in the hash table is incremented. The process repeats, as shown in step 1150 until N distinct requests with different origins have been analyzed. Finally, in step 1160, all components in the class base file with a hash table entry whose count equals zero is removed from the class base file. Comparing the class base file components with components from requested documents of distinct users ensures that those components in the class base file that do contain private information will have a count equal to zero in their hash table entry. Thus by removing such components, the class base file is secure.

Until the class base file is properly secured, responses to user requests may be limited to full requested documents rather than condensed documents. That is, distribution of the secured class base file may be delayed until after private information has been removed. Of course, in the case that an end user already has a current secured class base file and a rebase is triggered, the old secured class base file can be used until the updated class base file is properly secured.

One point to note is that the same end user may be falsely regarded by the condenser as a different user upon subsequent requests. This may occur, for example, if the user utilizes the Netscape Navigator® to send a first request and Microsoft® Internet Explorer to send a second request. Since the two Web browsers do not share cookies, the condenser will interpret the two requests from the same end user as originating from different users. Thus, if both requests contain the same private information, the above security mechanism may not exclude the private information.

In order to protect private data from such rare scenarios, a second parameter M, greater than zero but less than or equal to N, can be utilized in the security mechanism. That is, at step 1160, components whose hash table entry is less than M, rather than zero, are removed. Thus, M becomes an indication of the security level of the system. For example, if M=0, there is no security and if M=1 corresponds to the basic security scheme described earlier. Thus, as M increases, the stronger the security of the system becomes. However, to avoid reducing the size of the class base file and thus compromising performance, an exemplary embodiment of the present invention would keep N at least two as large as M.

Furthermore, this security mechanism can be executed simultaneously with the basing mechanisms for FIGS. 8 and 10. That is, while the delta-differences are being computed, the counts in the hash table can also be updated. Thus, whenever the basing mechanisms identify an new class base file, the securing mechanism is ready to remove private information from the file.

The various embodiments described above should be considered as merely illustrative of the present invention. Those skilled in the art will realize that the present invention is applicable regardless of whether the user is a person at a computer, or a network device such as a cache or a proxy agent. Those skilled in the art will realize that the present invention is also applicable to the full range of data forms transmitted on the Internet, including but not limited to text, images, video and audio. The various embodiments described above are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. A system comprising:
   at least one processor:
      a receiving module to receive a user request for a requested document;
      a condenser executed at least in part by the at least one processor to:
         retrieve the requested document from a content server,
         compare the requested document to a base file of a document class, wherein documents within the document class possess similar layouts, and
         associate the requested document with the document class based on a delta-difference between the requested document and the base file of the document class, in an automated manner; and
      a condensed document creator executed at least in part by the at least one processor to create a condensed document by abbreviating redundancy in the requested document relative to the base file of the document class.

2. The system of claim 1, further comprising a transmitting module to transmit the condensed document to a user computer system.

3. The system of claim 1, wherein the condenser is to:
   determine that the requested document is not associated with any document class; and
   associate the requested document with the document class.

4. The system of claim 1, wherein the condenser is to:
   determine that the requested document is not associated with any document class;
   generate the document class; and
   associate the requested document with the document class.

5. The system of claim 1, wherein the delta-difference is a byte size of the condensed document.

6. The system of claim 1, wherein the base file of the document class is selected from a randomly chosen sample of requested documents within the document class.

7. The system of claim 1, wherein the base file of the document class is created based on aggregated popular components of requested documents within the document class.

8. The system of claim 1, wherein the requested document is a dynamic template-based electronic document.

9. The system of claim 1, wherein the condenser is located between a user computer system and the content server.

10. The system of claim 1, comprising a new document class creator to:
    determine that the delta-difference between time requested document and the base file is greater than a determinable threshold value; and
    create a new document class associated with the requested document.

11. The system of claim 1, wherein the condenser is to associate the requested document with the document class if the delta-difference between the requested document and the base file of the document class is less than a determinable threshold value.

12. The system of claim 1, wherein the condenser is to associate the requested document with the document classes if the base file of the document class has the lowest delta-difference with the requested document.

13. The system of claim 1, comprising creator module to create the base file of the document class, the creator module being to:
- compare components of the base file components of a plurality of requested documents, the plurality of requested documents associated with requests originated from different users; and
- determine a component associated with the base file indicative of private information, based on a result of the comparison; and
- remove the component indicative of private information from the base file.

14. The system of claim 1, comprising a creator module to create the base file of the document class, the creator module being to:
- compare delta-differences between a group of sample documents belonging to the document class;
- summing the delta-difference for each of the sample documents of the group; and
- selecting the base file from the sample documents, wherein the base file has the lowest sum of delta-differences.

15. The system of claim 14, wherein the creator module is to replace at least one of the sample documents to update the group of sample documents.

16. The system of claim 14, wherein the creator module is to replace at least one of the sample documents with a requested document specified by a user.

17. The system of claim 14, wherein the creator module is to update the group of sample documents periodically.

18. A machine-readable medium having instruction data to cause a machine to:
- receive a user request for a requested document;
- retrieve the requested document from a content server;
- compare the requested document to a base file of a document class, wherein documents within the document class possess similar layouts;
- associate the requested document with the document class based on a delta-difference between the requested document and the base file of the document class, in an automated manner; and
- create a condensed document by abbreviating redundancy in the requested document relative to the base file of the document class.

19. The machine-readable medium of claim 13, having instruction data to cause a machine to transmit the condensed document to a user computer system.

20. A system comprising:
- at least one processor;
- means for receiving a user request for a requested document;
- means for retrieving the requested document from a content server;
- means for comparing the requested document to a base file of a document class, wherein documents within the document class possess similar layouts, the means for comparing being executed at least in part by the at least one processor;
- means for associating the requested document with the document class based on a delta-difference between the requested documents and the base file of the documents class, in an automated manner; and
- means for creating a condensed document by abbreviating redundancy in the requested document relative to the base file of the document class, the means for creating the condensed document being executed at least in part by the at least one processor.

* * * * *

UNITED STATES PATENT AND TRADEMARK OFFICE
CERTIFICATE OF CORRECTION

| | |
|---|---|
| PATENT NO. | : 7,603,483 B2 |
| APPLICATION NO. | : 11/756239 |
| DATED | : October 13, 2009 |
| INVENTOR(S) | : Konstantinos Psounis et al. |

It is certified that error appears in the above-identified patent and that said Letters Patent is hereby corrected as shown below:

In column 12, line 15, in Claim 1, delete "processor:" and insert -- processor; --, therefor.

In column 12, line 61, in Claim 10, delete "time" and insert -- the --, therefor.

In column 13, line 8, in Claim 13, after "comprising" insert -- a --.

In column 13, line 11, in Claim 13, after "file" insert -- to --.

In column 13, line 37, in Claim 18, delete "machine-readable" and insert -- computer-readable --, therefor.

In column 14, line 13, in Claim 19, delete "machine-readable" and insert -- computer-readable --, therefor.

In column 14, line 13, in Claim 19, delete "claim 13," and insert -- claim 18, --, therefor.

In column 14, line 30, in Claim 20, after "requested", delete "documents" and insert -- document --, therefor.

In column 14, line 30, in Claim 20, after "of the", delete "documents" and insert -- document --, therefor.

Signed and Sealed this

Twenty-third Day of March, 2010

David J. Kappos
*Director of the United States Patent and Trademark Office*